US010726576B2

(12) United States Patent
Noble et al.

(10) Patent No.: US 10,726,576 B2
(45) Date of Patent: Jul. 28, 2020

(54) SYSTEM AND METHOD FOR IDENTIFYING A CAMERA POSE OF A FORWARD FACING CAMERA IN A VEHICLE (71) Applicant: SEEING MACHINES LIMITED, Fyshwick (AU)

(72) Inventors: John Noble, Braddon (AU); Timothy James Henry Edwards, Kallista (AU)

(73) Assignee: Seeing Machines Limited, Fyshwick (AU)

(*) Notice: Subject to any disclaimer, the term of this patent is extended or adjusted under 35 U.S.C. 154(b) by 0 days.

(21) Appl. No.: 16/312,458

(22) PCT Filed: Jun. 29, 2017

(86) PCT No.: PCT/AU2017/050668
§ 371 (c)(1),
(2) Date: Dec. 21, 2018

(87) PCT Pub. No.: WO2018/000038
PCT Pub. Date: Jan. 4, 2018

(65) Prior Publication Data
US 2019/0266751 A1 Aug. 29, 2019

(30) Foreign Application Priority Data
Jun. 29, 2016 (AU) .................................. 2016902547

(51) Int. Cl.
G06T 7/73 (2017.01)
G06K 9/00 (2006.01)
(Continued)

(52) U.S. Cl.
CPC ............ G06T 7/74 (2017.01); G06K 9/00228 (2013.01); G06K 9/00604 (2013.01);
(Continued)

(58) Field of Classification Search
CPC .... G06T 7/80; G06T 7/73; G06T 7/60; G06T 7/74; G06T 2207/30201;
(Continued)

(56) References Cited

U.S. PATENT DOCUMENTS 8,941,561 B1 1/2015 Starner
2002/0075136 A1 6/2002 Nakaji et al.
(Continued)

FOREIGN PATENT DOCUMENTS

EP 2405399 1/2012
JP 2006156429 6/2006
(Continued)

OTHER PUBLICATIONS

Itkonen et al., 'Driver gaze behavior is different in normal curve driving and then looking at the tangent point', Public Library of Science (PLoS), PLoS ONE (10.8), Published Aug. 19, 2015.

Primary Examiner — Neil R Mikeska
(74) Attorney, Agent, or Firm — Jason P. Mueller; FisherBroyles, LLP (57) ABSTRACT A method includes capturing images of a vehicle driver's face from a driver facing camera and images of a forward road scene from a forward facing camera. The images are analyzed to derive gaze direction data in a vehicle frame of reference. The gaze direction data are statistically collated to determine a frequency distribution of gaze angles. One or more peaks in the frequency distribution are identified and associated with corresponding reference points in the images to determine one or more reference gaze positions in the vehicle frame of reference. The one or more reference gaze positions are correlated with a position of the reference points in a forward facing camera frame of reference to determine a camera pose of a forward facing camera in the vehicle frame of reference.

19 Claims, 6 Drawing Sheets (51) Int. Cl.
  *H04N 5/247* (2006.01)
  *G06T 7/80* (2017.01)
  *G06T 7/60* (2017.01)
(52) U.S. Cl.
  CPC ............ *G06K 9/00845* (2013.01); *G06T 7/60* (2013.01); *G06T 7/73* (2017.01); *G06T 7/80* (2017.01); *H04N 5/247* (2013.01); *G06T 2207/20081* (2013.01); *G06T 2207/30201* (2013.01); *G06T 2207/30244* (2013.01); *G06T 2207/30252* (2013.01); *G06T 2207/30256* (2013.01); *G06T 2207/30268* (2013.01)
(58) Field of Classification Search
  CPC . G06T 2207/20081; G06T 2207/30268; G06T 2207/30252; G06T 2207/30256; G06T 2207/30244; H04N 5/247; G06K 9/00845; G06K 9/00228; G06K 9/00604
  See application file for complete search history.

(56) References Cited

U.S. PATENT DOCUMENTS

| | | |
|---|---|---|
| 2003/0039378 A1 | 2/2003 | Yuasa et al. |
| 2004/0150514 A1 | 8/2004 | Newman et al. |
| 2005/0073136 A1 | 4/2005 | Larsson et al. |
| 2007/0069872 A1* | 3/2007 | Arakawa ............... B60Q 9/008 340/435 |
| 2007/0081262 A1* | 4/2007 | Oizumi .................... B60R 1/00 359/843 |
| 2009/0147080 A1 | 6/2009 | Inada |
| 2009/0261979 A1 | 10/2009 | Breed et al. |
| 2009/0295921 A1 | 12/2009 | Fujita |
| 2010/0033333 A1 | 2/2010 | Victor et al. |
| 2011/0310006 A1 | 12/2011 | Edwards et al. |
| 2012/0050138 A1* | 3/2012 | Sato ...................... G02B 27/01 345/4 |
| 2012/0050493 A1 | 3/2012 | Ernst et al. |
| 2013/0189649 A1 | 7/2013 | Mannino |
| 2013/0258512 A1* | 10/2013 | Raz ........................ B60R 1/07 359/843 |
| 2013/0304479 A1 | 11/2013 | Teller et al. |
| 2013/0325264 A1* | 12/2013 | Alcazar ................. B62D 1/181 701/49 |
| 2014/0204193 A1* | 7/2014 | Zhang ................ G06K 9/00597 348/78 |
| 2014/0211319 A1 | 7/2014 | Park et al. |
| 2014/0336876 A1 | 11/2014 | Gieseke et al. |
| 2014/0347486 A1 | 11/2014 | Okouneva |
| 2015/0116493 A1 | 4/2015 | Bala et al. |
| 2015/0160033 A1 | 6/2015 | Censo et al. |
| 2015/0210292 A1 | 7/2015 | George-svahn et al. |
| 2016/0379497 A1* | 12/2016 | Hatakeyama .......... G08G 1/166 340/435 |
| 2017/0001648 A1* | 1/2017 | An ........................ B60W 30/08 |

FOREIGN PATENT DOCUMENTS

| | | |
|---|---|---|
| JP | 2013092509 | 5/2013 |
| KR | 20090052413 | 5/2009 |
| WO | 2011155878 | 12/2011 |

* cited by examiner

SYSTEM AND METHOD FOR IDENTIFYING A CAMERA POSE OF A FORWARD FACING CAMERA IN A VEHICLE

This application is a national stage entry under 35 U.S.C. 371 of PCT Patent Application No. PCT/AU2017/050668, filed Jun. 29, 2017, which claims priority to Australian Patent Application No. 2016902547, filed Jun. 29, 2016, the entire contents of which are incorporated herein by reference.

FIELD

The present disclosure relates to camera monitoring systems and in particular to a system and method for identifying a camera pose of a forward facing camera in a vehicle. Embodiments of the disclosure have been particularly developed for driver monitoring systems in vehicles. While some embodiments will be described herein with particular reference to that application, it will be appreciated that the disclosure is not limited to such a field of use, and is applicable in broader contexts.

BACKGROUND

Any discussion of the background art throughout the specification should in no way be considered as an admission that such art is widely known or forms part of common general knowledge in the field.

In monitoring and surveillance systems, it is often necessary to monitor a scene from different perspectives. This is typically achieved by positioning multiple cameras at different positions and orientations throughout the scene. In some applications, it is advantageous to be able to track and map the positions of objects from the field of view of one camera to another. This is generally possible when the fields of view of the different cameras are overlapping or directly adjacent.

In vehicle and driver monitoring systems, the inventors have identified advantages in being able to map the gaze of the driver as viewed from a driver facing camera onto a forward facing road scene as viewed from a forward facing camera. To perform such a mapping procedure, it is necessary to know accurately the relative positions and orientations of each camera so that an accurate mapping or projection of the object position between each camera view can be performed. Unfortunately, the cameras in these systems have vastly different camera poses and do not have overlapping or adjacent fields of view.

SUMMARY

In accordance with a first aspect of the present disclosure there is provided a method of determining a camera pose of a forward facing camera in a vehicle scene, the method including:
a) capturing images of a vehicle driver's face from a driver facing camera and images of the forward road scene from a forward facing camera;
b) processing the images of the driver's face from the driver facing camera to derive gaze direction data in a vehicle frame of reference;
c) statistically collating the gaze direction data into a frequency distribution of gaze angles;
d) identifying one or more peaks in the frequency distribution and associating the one or more peaks with corresponding reference points in the images of the forward road scene from the forward facing camera to determine one or more reference gaze positions in the vehicle reference frame; and
e) correlating the one or more reference gaze positions with a position of the reference points in the forward facing camera reference frame to determine a camera pose of a forward facing camera in the vehicle frame of reference.

In one embodiment the reference points include a position of the road in front of the vehicle.

In some embodiments stage d) includes determining a location of a road lane in front of the vehicle by processing the images captured by the forward facing camera. In one embodiment stage d) includes determining an angle of gradient of the vehicle. In one embodiment stage d) includes identifying the position of the driver's head within the vehicle cabin. The position of the driver's head may be identified by performing facial recognition on the driver and loading physiological data. In one embodiment a seat height, angle and/or lateral position of the driver's seat is determined.

In some embodiments stage b) includes:
i. determining the camera pose of the driver facing camera in a vehicle frame of reference; and
ii. transforming the gaze direction data into the vehicle frame of reference;

In one embodiment stage b)i. includes determining the orientation of the driver facing camera in the vehicle coordinate system using an orientation sensor.

In one embodiment stage b)i. includes
i. capturing one or more images of the vehicle scene from the driver facing camera; and
ii. comparing the one or more images of the vehicle scene to reference information about the vehicle scene.

In accordance with a second aspect of the present disclosure there is provided a computer system configured to perform a method according to the first aspect.

In accordance with a third aspect of the present disclosure there is provided a non-transitive carrier medium carrying computer executable code that, when executed on a processor, causes the processor to perform a method according to the first aspect.

In accordance with a fourth aspect of the present disclosure there is provided a computer program configured to perform a method according to the first aspect.

BRIEF DESCRIPTION OF THE DRAWINGS

Embodiments of the disclosure are described below, by way of example only, with reference to the accompanying drawings in which.

DETAILED DESCRIPTION

System Overview

The embodiments of the present disclosure described herein relate to determining a camera pose of a forward facing camera in a multi-camera vehicle monitoring system. In these embodiments, the scene to be imaged includes a driver of a vehicle, the interior of the vehicle/cockpit, the forward road scene of the vehicle and optionally side and rear views from the vehicle. The vehicle may represent a commercial automobile, truck, earthmoving machine, airplane, jet or helicopter. However, it will be appreciated that the disclosure is applicable to other multi-camera monitoring systems.

Use of the term camera pose herein represents a three dimensional position and three dimensional orientation of a camera within a scene.

Figure 1:
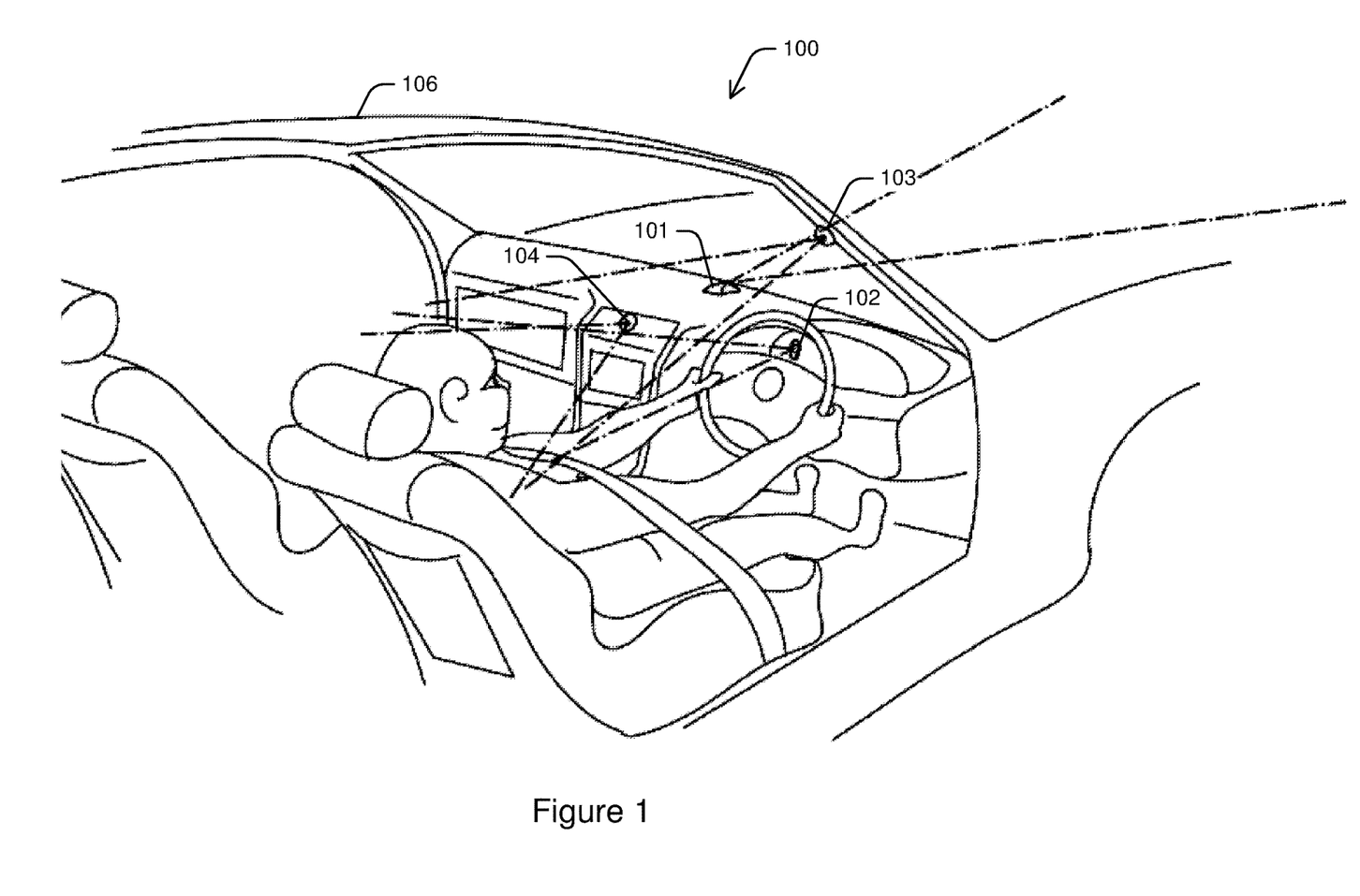
FIG. 1 is a perspective view of a four camera monitoring system positioned within a vehicle.
Figure 2:
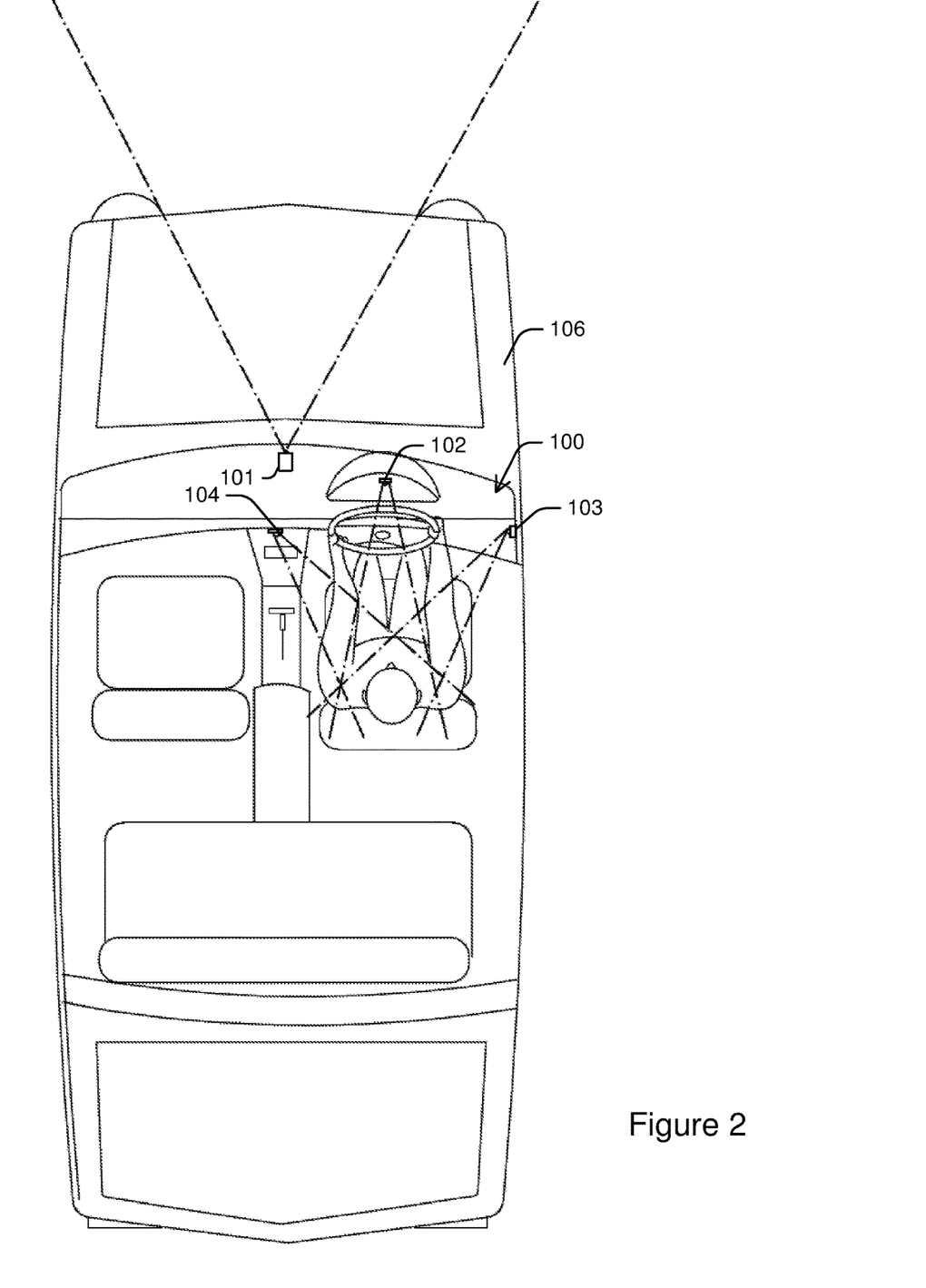
FIG. 2 is a plan view of the four camera monitoring system of FIG. 1.

Referring initially to FIGS. 1 and 2, there is illustrated a vehicle monitoring system 100 including four cameras 101-104 disposed at different locations within a vehicle 106. Camera 101 is positioned on a dashboard of the vehicle and oriented in a forward direction of the vehicle for monitoring the forward road scene. Cameras 102, 103 and 104 are positioned and oriented to monitor a driver 108 of vehicle 106. Camera 102 is positioned on or adjacent an instrument panel of vehicle 106 or on the steering column of vehicle 106. Camera 103 is positioned on the driver side A-pillar of the frame of vehicle 106. Camera 104 is positioned on or adjacent a center console of vehicle 106, preferably adjacent a display screen in vehicles where such a screen is provided. The specific camera locations are exemplary only and it will be appreciated that more or less cameras can be incorporated at other locations within or outside vehicle 106 to monitor the driver, the forward road scene or other views in or around the vehicle. Other exemplary camera locations of cameras include a rearview mirror, rear bumper, front bumper, vehicle roof and bonnet/hood.

Figure 3:
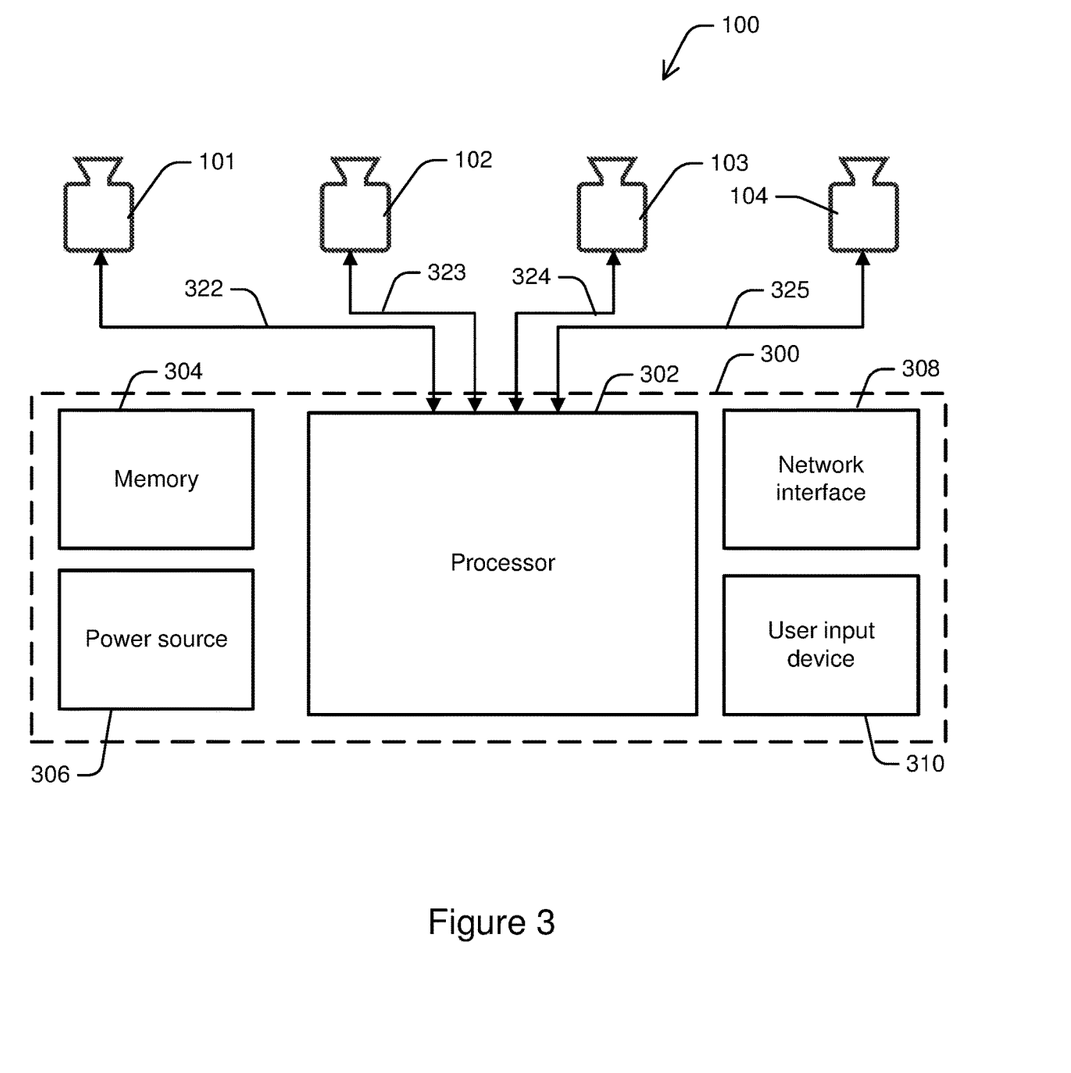
FIG. 3 is a schematic system level diagram of the four camera monitoring system of FIGS. 1 and 2.

Referring now to FIG. 3, there is illustrated a system level diagram of system 100. System 100 includes a central processing unit 300 including a processor 302, memory 304, a power source 306, a network interface 308 and a user input device 310. In the embodiments of a vehicle monitoring system, central processing unit 300 is preferably mounted within the vehicle dash or center console and can be integrated with an onboard vehicle computer system during manufacture. However, central processing unit 300 and system 100 as a whole may be manufactured as an aftermarket product and subsequently installed into vehicle in a modular manner.

Processor 302 may represent a conventional microprocessor or personal computer having hardware and/or software configured for processing image streams received from multiple cameras. By way of example, processor 302 may include system-on-chip technology and include a video processing pipeline for processing the stream of images from cameras 101-104. In one embodiment, processor 302 is integral with or in communication with a processor of an onboard vehicle computer system.

Central processing unit 300 is powered by connection to a power source 306. In one embodiment, power source 306 represents an electrical connection to a vehicle power source such as the vehicle battery. In another embodiment, power source 306 represents a local battery integrated within a housing of central processing unit 300 and optionally connected to an external power source for recharging.

Network interface 308 provides for communicating data to and from system 100 and represents an electrical or wireless interface for connecting system 100 to other devices or systems. Network interface 308 includes wired network ports such as USB, HDMI or Ethernet ports, serial device ports and/or wireless devices such as a Bluetooth™ device, Wi-Fi™ device or cellular network transceiver.

User input is able to be provided to system 100 through user input device 310, which can include a touchscreen display or a keyboard or keypad and associated display. User input device 310 may also represent external devices such as computers or smartphones connected to system 100 through network interface 308 or other means. In one embodiment, user input device 310 represents a computer system integrated into the vehicle and manipulated through a display interface mounted in the vehicle's center console.

Example data that can be input to system 100 through user input device 310 includes:

Initial or reference position and orientation data for cameras 101-104;
  Positions of other reference points in the vehicle;
  Model data of the vehicle or vehicle cabin;
  Driver images for facial recognition;
  Driver details such as driver height for determining eye positions within the vehicle; and
  Software updates for processor 302 such as updated gaze tracking algorithms.

Example data that can be extracted from system 100 through user input device 301 includes:

Statistical gaze direction data;
  Camera realignment data; and
  Raw or processed image/video data from cameras 101-104.

System 100 includes four camera units 312-315, which are mounted at relative locations within or about the scene to be monitored. Each camera unit 312-315 includes a respective camera 101-104 for capturing images of the scene within its respective field of view.

Each camera is electrically connected to central processing unit 300 through respective connections 322-325 including electrical cables and associated electrical ports. The electrical connections provide for control of cameras 101-104 by processor 302 and transmission of image data from cameras 101-104.

Cameras 101-104 may utilize various types of known image sensors in combination with imaging optics. Example image sensors include charge-coupled devices (CCDs) or complementary metal-oxide-semiconductor (CMOS) chips combined with relevant processing electronics and memory to capture images and/or video sequences in suitable formats for subsequent image processing. Cameras 101-104 may be capable of capturing images in two or three dimensions.

In the vehicle scene, the frame of reference may be defined relative to a region of the vehicle frame. By way of example, a reference coordinate system may be defined as having a z-axis aligned along the vehicle drive shaft (longitudinal dimension), an x-axis aligned along the front wheel axle (defining a transverse dimension) with the right wheel being in the positive direction and a y-axis defining a generally vertical dimension to complete the orthogonal coordinate system. This exemplary coordinate system will be used herein to describe the disclosure. However, it will be appreciated that other arbitrary reference coordinate systems may be chosen.

Figure 4:
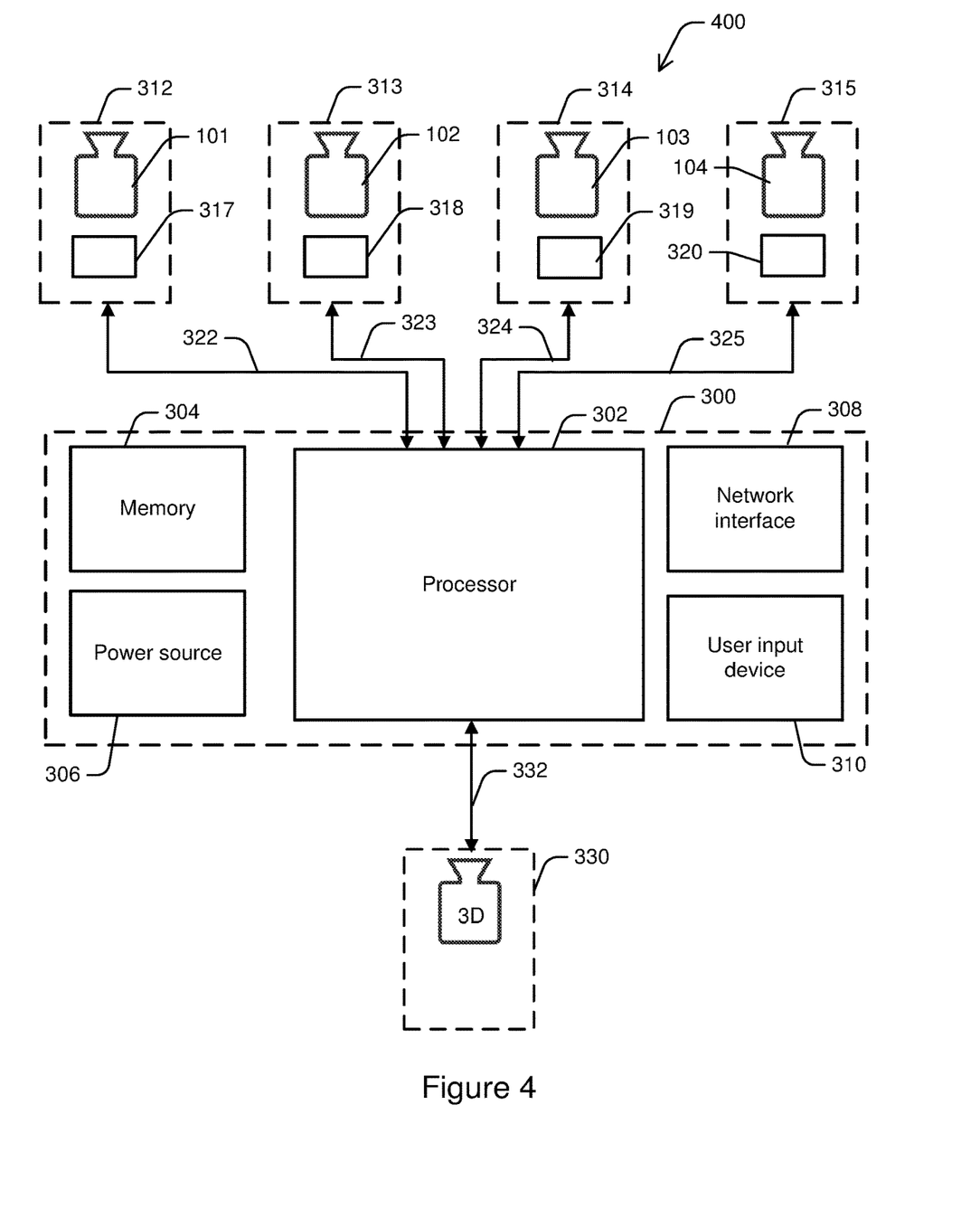
FIG. 4 is a schematic system level diagram of an alternate four camera monitoring system which utilizes orientation sensors to measure the orientation of the cameras.

An alternative embodiment system 400 is illustrated in FIG. 4. Here corresponding features of system 100 are designated with the same reference numerals. System 400 includes four camera units 312-315, which are mounted at relative locations within or about the vehicle scene. Each camera unit 312-315 includes not only respective cameras 101-104 but also respective orientation sensors 317-320 for measuring the orientation of the associated camera relative to a reference orientation.

Orientation sensors 317-320 may include simple inertial devices such as accelerometers and gyroscopes and other devices such as magnetometers and more advanced inertial measurement units, or combinations thereof. Orientation sensors 317-320 may be capable of measuring orientation in one, two or three dimensions relative to a reference orientation. A suitable reference orientation is that described above using the vehicle drive shaft and front wheel axle. However, it will be appreciated that a reference orientation can be chosen arbitrarily based on the particular application. For example, if two or more cameras were aligned along a common axis, that axis may be preferred as the reference orientation. The orientations are preferably expressed in a three dimensional Cartesian coordinate system. However, it will be appreciated that the orientations can be expressed in any arbitrary coordinate system such as a spherical coordinate system wherein an orientation vector is expressed in terms of a radial distance (r), a zenith angle (θ) in a vertical plane and an azimuthal angle (ϕ) in a horizontal plane.

In one embodiment, the orientation sensors 317-320 are mounted integrally on respective cameras 101-104. In another embodiment, orientation sensors 317-320 are mounted relative to each camera 101-104 on an intermediate support frame on which the camera is also mounted.

Various types of camera mounts and actuators are able to be used in the present disclosure, including but not limited to C-type or T-type screw threaded mounts, hydraulic actuator mounts, thermal or magnetic actuator mounts and piezoelectric actuator mounts.

Monitoring system 100 preferably also includes one or more LEDs (not illustrated) for illuminating driver 108 to improve the quality of the captured images. To reduce distraction to the driver, the LEDs preferably emit infrared radiation that is invisible to the human eye. Thus, the image sensors of cameras 101-104 are preferably capable of imaging in the infrared region to leverage the illumination by the LEDs.

Initially, the cameras are installed in their desired locations within the scene to be monitored and their respective positions and initial orientations are registered in memory 304 through user input device 310. The cameras are preferably mounted at locations in or around the vehicle such as those in FIGS. 1 and 2 so as to position the driver and the forward road scene within their respective fields of view. Camera installation may be performed during manufacture of the vehicle or during a subsequent installation of systems 100 or 400 in vehicle 106.

The initial position/orientation registration may be performed manually or in a quasi-automated manner utilizing orientation sensors 317-320 and a depth imaging device 340 as described in Australian provisional patent application 2016902544, filed on 29 Jun. 2016. The contents of Australian provisional patent application 2016902544 are incorporated herein by way of cross reference. Depth imaging device 340 can include one or more of a scanning or pulsed time of flight camera, LIDAR system, stereoscopic camera arrangement, structured light 3D scanner, image sensor with phase detection or any other imaging system capable of capturing images of a scene in three dimensions. Depth imaging device 340 is operatively associated with processor 302 through a dedicated electrical connection to provide control to device 340 and receive raw three dimensional image data or pre-processed depth map data from device 340. In some embodiments depth imaging device 340 is connected to central processing unit 300 and processor 302 through network interface 308.

During the installation of the camera units 312-315, each unit is electrically connected to central processing unit 300 through respective connections 322-325. The frame of reference within the scene, such as those described above, is also defined. It is preferable that the reference orientation is defined by the scene geometry such that it remains constant over time.

The vehicle frame of reference is used as the central reference frame (or world reference) from which all measurements within system 100 will be taken. However, the cameras must first be calibrated to that frame of reference from their own frame of reference.

Determining a Camera Pose of a Forward Facing Camera

Figure 5:
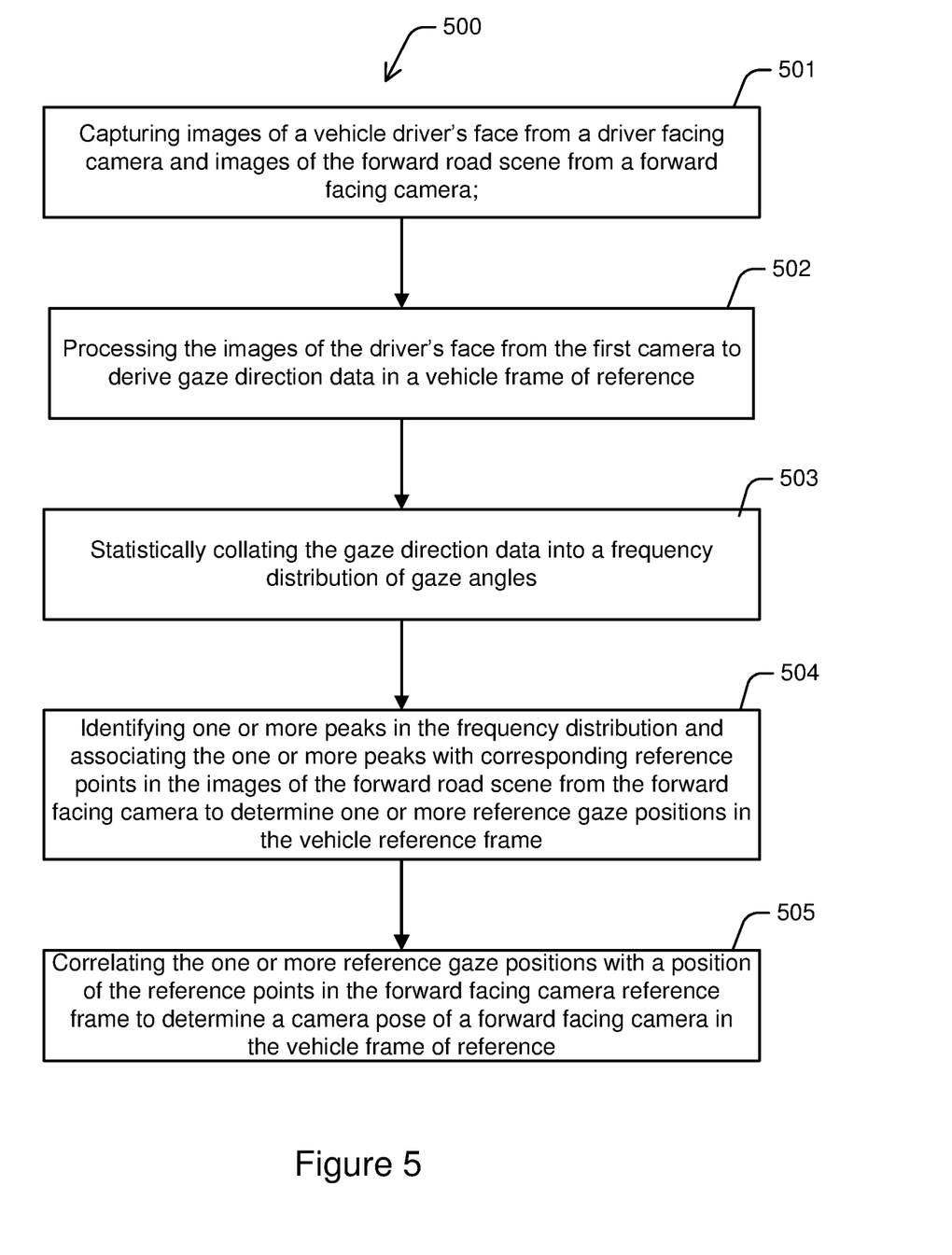
FIG. 5 is a functional flow diagram illustrating the primary stages in a method of determining a camera pose of a forward facing camera in a multi-camera imaging system.

The operation of system 100 (and system 400) for determining a camera pose of a forward facing camera (camera 101) in a vehicle scene will be described with reference to method 500 illustrated in the flow chart of FIG. 5.

At stage 501, images of a vehicle driver's face are captured from driver facing camera 102 in that camera's local frame of reference. Also images of the forward road scene are captured from forward facing camera 101 in that camera's frame of reference. These images are captured during normal operation of the vehicle when the driver is seated in the driver's seat and the vehicle is travelling along roads. The captured images are stored in memory 304 for processing by processor 302.

At stage 502, the images of the driver's face from driver facing camera 102 are processed to derive gaze direction data in a vehicle frame of reference. This can be performed by a number of methods known in the art such as in U.S. Pat. No. 7,043,056 to Edwards et al. entitled "Facial Image Processing System", which is assigned to Seeing Machines Pty Ltd. The contents of U.S. Pat. No. 7,043,056 are incorporated herein by way of cross reference.

The derived gaze direction data is initially expressed as two or three dimensional coordinates in the frame of reference of camera 102. To convert the gaze direction data into the vehicle frame of reference for use by other cameras, a transformation of the camera pose of camera 102 into the vehicle frame of reference is required. In one embodiment, this is achieved by capturing one or more images of the vehicle scene from the driver facing camera 102 and comparing the one or more images of the vehicle scene to reference information about the vehicle scene. In one embodiment, the reference information includes an earlier captured image by the camera at a known camera pose in the vehicle frame of reference. In another embodiment, the reference information includes a three dimensional model of the vehicle cabin, such as a CAD model of the vehicle design. The reference information includes two or three dimensional positions of known objects or regions within the vehicle scene such as dashboard instruments, cabin contours and edges or the entire cabin itself in the case of a three dimensional CAD model. The comparison may include performing pattern matching of the known objects or regions within the scene, as seen in both the captured images and the reference information. The comparison may also include an estimation based on a machine learning process such as a neural network having previously learned the structure of the vehicle scene.

Once the gaze direction data is calculated in the vehicle frame of reference, at stage 503, the gaze direction data is statistically collated into a frequency distribution of gaze angles. This may include performing a statistical analysis on the gathered data over a statistically significant period of time. For example, system 100 makes use of historical gaze direction data stored in memory 304 in a manner similar to that described in U.S. Pat. No. 8,982,046 to Edwards et al. entitled "*Automatic Calibration of a Gaze Direction Algorithm from User Behavior*", which is assigned to Seeing Machines Limited. The contents of U.S. Pat. No. 8,982,046 are incorporated herein by way of cross reference. This technique involves using known reference points within the scene to calibrate gaze coordinates with the scene geometry.

Figure 6:
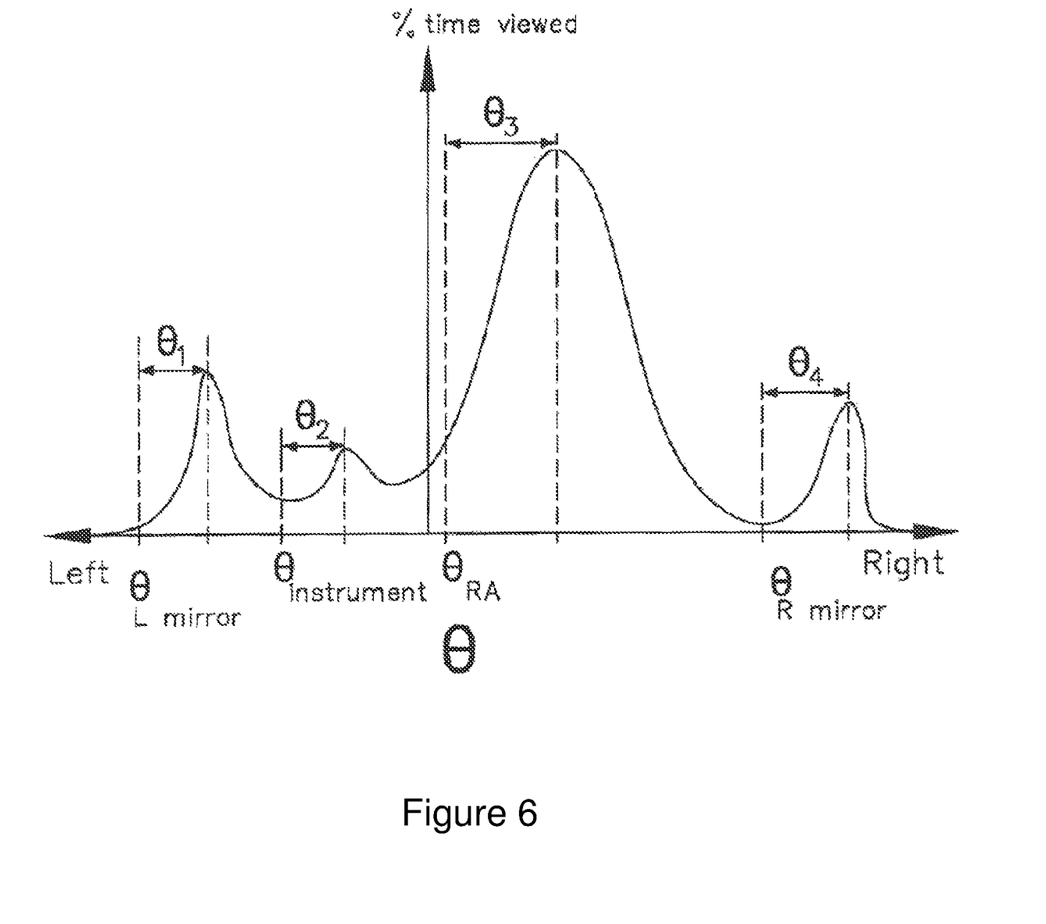
FIG. 6 illustrates schematically an example plot of a vehicle driver's gaze time versus angle, where the known angular directions of scene objects used for calibration are indicated.

The historical gaze direction data are collated statistically to form a frequency distribution of gaze angles such as in a one or two dimensional histogram having bins of gaze position or angle. An example one dimensional gaze direction histogram is illustrated in FIG. 6. A similar histogram could be obtained for the orthogonal direction.

At stage 504, the statistical data are analyzed to identify one or more peaks in the frequency distribution. Identified peaks are associated with corresponding reference points in the images of the forward road scene from forward facing camera 101. This association allows the determination of reference gaze positions in the vehicle reference frame. For mapping the gaze onto images of the forward facing camera 101, the reference points must lie within the field of view of camera 101 to be useful.

The peaks in the gaze histogram represent points more commonly regarded and these can be calibrated against known objects or reference points within the scene with which the driver is likely to observe. Example objects or reference points within the vehicle cabin include a vehicle center console, the vehicle dash instrument panel, the driver's lap, the left and right reversing mirrors and the rearview mirror. However, these objects do not typically lie in the field of view of the forward facing camera 101. For the purpose of mapping the gaze to the images of the forward facing camera 101, the center of the lane in front of the vehicle typically represents the most commonly viewed reference point within the field of view of camera 101. The center of the lane represents a center of optical flow indicating the default eye gaze position on the forward road scene that the driver views during normal vehicle operation. This will typically reflect a point roughly in the center of the current lane in which the vehicle is travelling at a distance of 10 meters to 50 meters in front of the vehicle. Thus, it will have the largest peak in a driver gaze histogram.

As the center of the lane is a variable region, a large amount of statistical data should be used to more precisely locate this region. Further, as this region varies horizontally with road curvature and vertically with road gradient, system 100 may leverage additional data to account for these variations. By way of example, system 100 may determine a location of a road lane in front of the vehicle by processing the images captured by forward facing camera 101. Identification of the lane markings can determine horizontal boundaries within which the driver's gaze is likely to lie. Additionally, leveraging angle of gradient of the vehicle due to road gradient by an on-board vehicle orientation sensor can be used to more accurately identify likely gaze position in the forward road scene.

Accordingly, it is possible to accurately determine a two or three dimensional region, within the images captured by forward facing camera 101, which corresponds to the peak in the gaze direction histogram. The size of the region of the forward road scene is dependent on the amount and type of data used. In one embodiment, a machine learning process such as a neural network is fed the gaze direction data (in the vehicle frame of reference), lane position data and vehicle gradient data to learn patterns of gaze behaviour.

During periods where the driver gaze is highly likely to be looking at the center of the lane position (or another reference point), at stage 504, reference gaze position (peak in the gaze histogram) is correlated with a determined position of the center lane position. That is, the largest peak in the gaze histogram is correlated with the gaze direction data by specifying that gaze position with the estimated three dimensional position of the point of regard on the road. This allows the correlation of a point in the frame of reference of the forward facing camera 101 with a point in the vehicle frame of reference, as captured by the driver facing camera 102. Thus, a camera pose of forward facing camera 101 in the vehicle frame of reference can be determined. This process can be repeated over time to more accurately calibrate the camera pose of camera 101 with the vehicle frame of reference.

Thus, by estimating the position of the center of the forward road lane (or other object/region statistically definable by gaze definable), the gaze direction calculated form images of the driver's face captured from one of cameras 102-104 can be accurately mapped to the forward facing road scene captured by camera 101. The projection or mapping may be performed by deriving a transformation function or matrix which maps the gaze direction observed in the driver facing camera onto the forward facing road scene images captured from the forward facing camera. In some embodiments, the calibration may be performed with multiple histogram peaks indicating a plurality of known reference objects or points.

As the peak in the gaze histogram is dependent on the origin of the driver's eyes, this calibration technique is dependent upon the physiology of the driver (having different head heights etc). In some embodiments, face recognition can be used to register the driver and load past gaze direction data or a predetermined gaze histogram. This may optionally be augmented with the current seat height, angle and lateral positions settings for additional accuracy.

It will be appreciated that the system and method described above provides for efficiently and accurately determining a camera pose of a forward facing camera in a multi-camera vehicle system. This allows the camera pose of a forward facing camera to be determined in a common vehicle reference frame using gaze direction data from the vehicle driver. From this, the driver's eye gaze direction captured from a driver facing camera can be projected onto images of a forward facing camera to indicate a point of regard of the driver during vehicle operation.

Interpretation

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several stages, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described for clarity. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, embodiments of the present disclosure may take the form of a method, an entirely hardware embodiment, an entirely software embodiment or an embodiment combining software and hardware embodiments. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the stages of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or stages listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Figure, or description thereof for the purpose of streamlining the disclosure and aiding in the understanding of one or more of the various embodiments. This method of disclosure, however, is not to be interpreted as reflecting an intention that the claims require more features than are expressly recited in each claim. Rather, as the following claims reflect, embodiments lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while various embodiments have been disclosed, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Stages may be added or deleted to methods described within the scope of the present disclosure.

We claim:

1. A processor-implemented method of calibrating a camera pose of a forward facing camera in a vehicle using a driver facing camera, the method comprising:
   a) capturing, by the driver facing camera, images of a vehicle driver's face during normal operation of the vehicle, and capturing, by the forward facing camera, images of a forward road scene;
   b) processing, by a processor circuit, the images of the vehicle driver's face to derive gaze direction data relative to a vehicle frame of reference;
   c) statistically collating the gaze direction data to determine a spatial frequency distribution of gaze angles for driver gaze behavior during normal operation of the vehicle;
   d) processing, by the processor circuit, the images of the forward road scene to identify one or more reference points in the forward road scene in a forward facing camera frame of reference;
   e) identifying one or more peaks in the frequency distribution of gaze angles and associating the one or more peaks with corresponding ones of the one or more reference points identified in the images of the forward road scene to determine one or more reference gaze positions in the vehicle frame of reference; and
   f) correlating the one or more reference gaze positions with a position of the reference points in a forward facing camera frame of reference to determine the camera pose of the forward facing camera in the vehicle frame of reference.

2. The method according to claim 1, wherein the one or more reference points include a position of a road in front of the vehicle.

3. The method according to claim 2, wherein stage e) includes determining a location of a road lane in front of the vehicle by processing the images captured by the forward facing camera.

4. The method according to claim 2, wherein stage e) includes determining an angle of gradient of the vehicle.

5. The method according to claim 2, wherein stage e) includes identifying a position of the driver's head within the vehicle.

6. The method according to claim 5, further comprising identifying the position of the driver's head by performing facial recognition on an image of the driver's face and based on physiological data.

7. The method according to claim 5, further comprising determining a seat height, an angle, and/or a lateral position of a driver's seat.

8. The method according to claim 1, wherein stage b) further comprises:
   i. determining the camera pose of the driver facing camera in the vehicle frame of reference; and
   ii. transforming the gaze direction data into data corresponding to the vehicle frame of reference.

9. The method according to claim 8, wherein stage b)i. includes determining an orientation of the driver facing camera in a vehicle coordinate system using an orientation sensor.

10. The method according to claim 8, wherein stage b)i. includes
   A. capturing one or more images of a vehicle scene from the driver facing camera; and
   B. comparing the one or more images of the vehicle scene to reference information about the vehicle scene.

11. A computer system configured to perform a method according to claim 1.

12. A non-transitory computer readable storage medium having computer program instructions stored thereon that, when executed by a processor, cause the processor to perform a method according to claim 1.

13. The method according to claim 1, wherein stage a) includes capturing, by a plurality of driver facing cameras, images of a vehicle driver's face.

14. The method according to claim 1, wherein the one or more reference gaze positions are determined by a machine learning process, that learns patterns of gaze behavior, based on one or more of gaze direction data, lane position data, and vehicle gradient data.

15. The method according to claim 1, wherein determining one or more reference gaze positions includes determining a center lane position of a forward road lane in front of the vehicle.

16. A vehicle monitoring system, comprising:
   one or more driver facing cameras positioned in a vehicle and configured to capture images of a vehicle driver's face during normal operation of the vehicle;
   a forward facing camera positioned in the vehicle and configured to capture images of a forward road scene in front of the vehicle;
   a processor circuit configured to:
      process images of the driver's face captured by the driver facing camera to derive gaze direction data in a vehicle frame of reference;
      statistically collate the gaze direction data to determine a frequency distribution of gaze angles for driver gaze behavior during normal operation of the vehicle;
      process images of the forward road scene to identify one or more reference points in the forward road scene in a forward facing camera frame of reference;
      identify one or more peaks of the frequency distribution, and to associate the one or more peaks with a corresponding one or more reference points in images of the forward road scene captured by the forward facing camera to determine one or more reference gaze positions in the vehicle frame of reference; and
      correlate the one or more reference gaze positions with positions of the reference points in a forward facing camera frame of reference to determine a camera pose of a forward facing camera in the vehicle frame of reference.

17. The system according to claim 16, wherein determining one or more reference gaze positions includes determining a center lane position of a forward road lane in front of the vehicle.

18. The system according to claim 17, further comprising an on-board orientation sensor configured to determine an angle of gradient of the vehicle, and wherein the angle of gradient of the vehicle is used to determine a center lane position.

19. The system according to claim 17, wherein the processor is configured to process images captured by the forward facing camera to determine a location of a road lane in front of the vehicle, and wherein the location of the road lane is used to determine a center lane position.

* * * * *